United States Patent
Wang et al.

(10) Patent No.: US 8,249,673 B2
(45) Date of Patent: Aug. 21, 2012

(54) SLIDING-TYPE PORTABLE ELECTRONIC DEVICE

(75) Inventors: Ying-Zhuo Wang, Shenzhen (CN); Hsiao-Hua Tu, Taipei Hsien (TW); Gang Yang, Shenzhen (CN); Wen-Wei Song, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 502 days.

(21) Appl. No.: 12/508,996

(22) Filed: Jul. 24, 2009

(65) Prior Publication Data

US 2010/0041450 A1 Feb. 18, 2010

(30) Foreign Application Priority Data

Aug. 15, 2008 (CN) .......................... 2008 1 0303860

(51) Int. Cl.
*H04M 1/00* (2006.01)

(52) U.S. Cl. ................ 455/575.4; 455/90.3; 379/433.12

(58) Field of Classification Search ............... 455/575.4, 455/90.3; 379/433.12; 439/11, 138, 142, 439/338, 374
See application file for complete search history.

(56) References Cited

U.S. PATENT DOCUMENTS

| | | | | |
|---|---|---|---|---|
| 6,973,186 | B2* | 12/2005 | Shin | 379/433.12 |
| 7,422,436 | B2* | 9/2008 | Lee | 439/10 |
| 7,463,913 | B2* | 12/2008 | Nagashima | 455/575.4 |
| 7,697,280 | B2* | 4/2010 | Wang | 361/679.55 |
| 7,822,447 | B2* | 10/2010 | Kim | 455/575.4 |
| 8,055,316 | B2* | 11/2011 | Jang et al. | 455/575.4 |
| 2008/0058039 | A1* | 3/2008 | Lee et al. | 455/575.4 |
| 2008/0200222 | A1* | 8/2008 | Jang et al. | 455/575.4 |
| 2008/0304218 | A1* | 12/2008 | Park et al. | 361/681 |
| 2009/0137293 | A1* | 5/2009 | Yoo et al. | 455/575.4 |

* cited by examiner

*Primary Examiner* — Duc M Nguyen
(74) *Attorney, Agent, or Firm* — Altis Law Group, Inc.

(57) ABSTRACT

A portable electronic device comprises a cover, a base and a sliding mechanism. The sliding mechanism includes a connecting rod mechanism and a controlling mechanism. The connecting rod mechanism is rotatably mounted between the base and the cover and is configured to rotate the cover relative to the base. The controlling mechanism is configured to control the rotation of the connecting rod mechanism.

19 Claims, 7 Drawing Sheets

SLIDING-TYPE PORTABLE ELECTRONIC DEVICE

BACKGROUND

1. Technical Field

The exemplary embodiment generally relates to sliding-type portable electronic devices, and particularly to sliding-type portable electronic device that can slide automatically.

2. Description of Related Art

Sliding mechanisms are widely used in portable electronic devices, such as mobile phones and personal digital assistants (PDAs). A typical sliding mechanism usually includes a sliding member, a fixable member and a resilient member. The sliding member is slidably mounted on the fixable member. The resilient member is used to drive the sliding member to slide and/or return the moved sliding member to its initial position. In use, the sliding mechanism is assembled in a portable electronic device including a base and the cover, the fixable member is fixed to the base and the sliding member is fixed to the cover. Thus, the cover can slide back and forth to slide on the base, and covers or exposes keypad(s) mounted on the base.

However, in use of the typical sliding mechanism, the resilient member generally cannot automatically drive the sliding member and the cover to move to predetermined positions. Thus, the portable electronic device using the typical sliding mechanism cannot be conveniently used.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary sliding-type portable electronic device, in the drawings like reference numerals designate corresponding parts throughout the several views. Wherever possible, the same reference numbers are used throughout the drawings to refer to the same or like elements of an embodiment.

DETAILED DESCRIPTION

Figure 1:
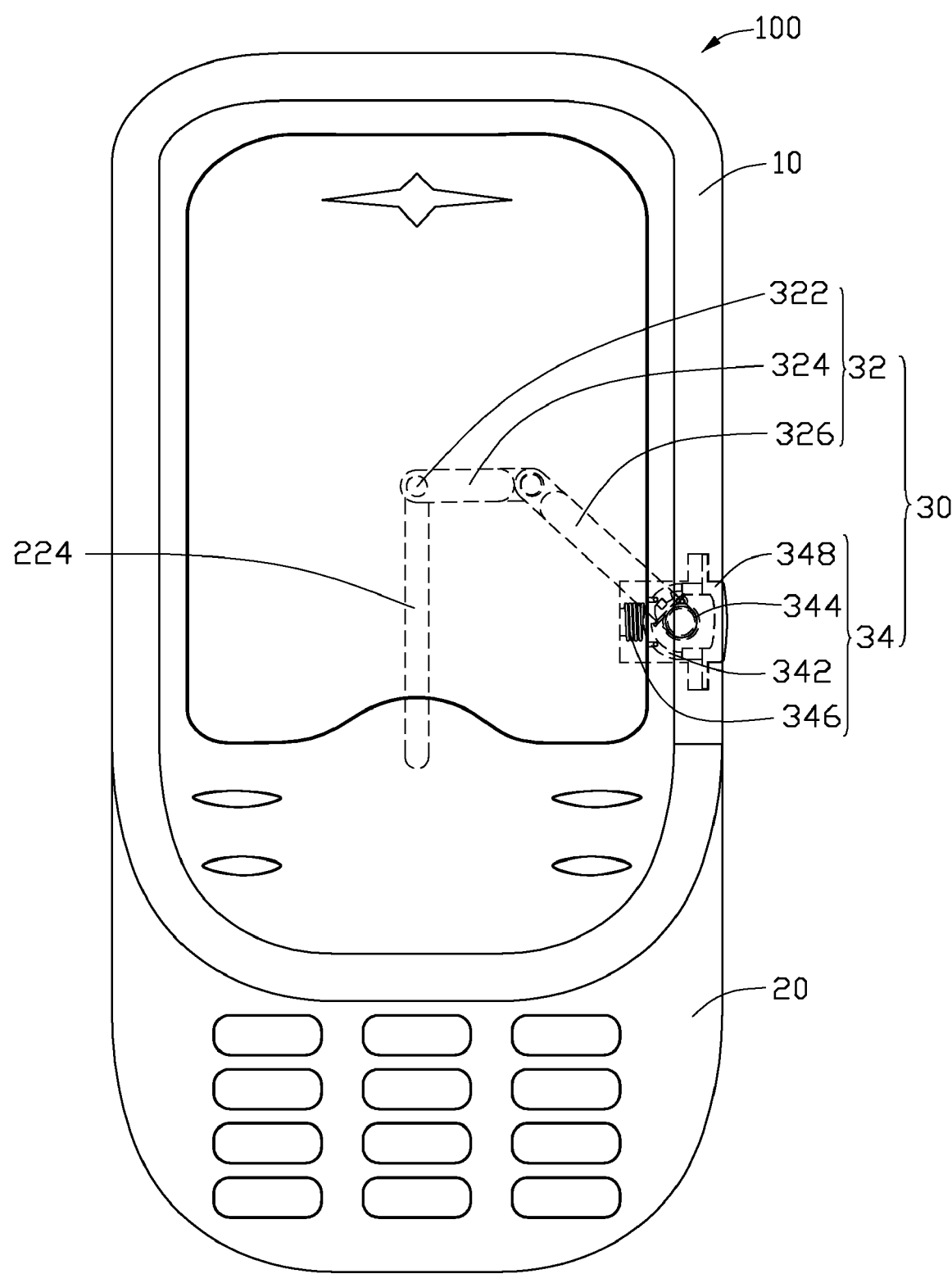
FIG. 1 is an assembled and perspective view of an exemplary embodiment of a sliding portable electronic device including a cover, a base, and a sliding mechanism, when the portable electronic device is opened.
Figure 2:
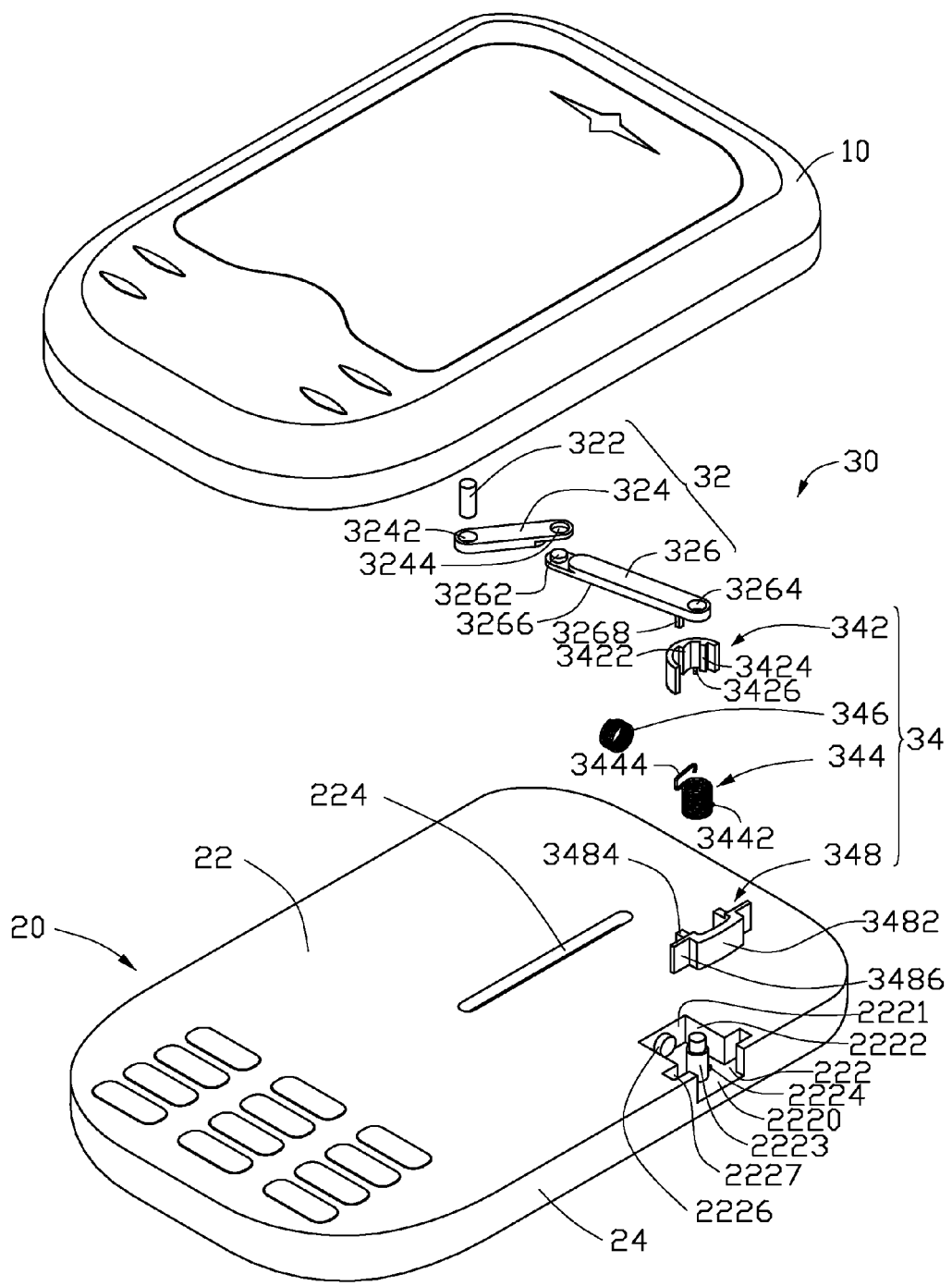
FIG. 2 is an exploded view of the portable electronic device shown in FIG. 1.

Referring to FIGS. 1 and 2, an exemplary embodiment of a portable electronic device 100 (e.g., mobile phone) with a sliding mechanism 30. The portable electronic device 100 includes a base 20 and a cover 10 slidably mounted to the base 20 by the sliding mechanism 30. The sliding mechanism 30 includes a connecting rod mechanism 32 configured for making the cover 10 slide relative to the base 20, and a controlling mechanism 34 configured for controlling the connecting rod mechanism 32. The connecting rod mechanism 32 includes a sliding element 322, a first connecting rod 324, and a second connecting rod 326. One end of the first connecting rod 324 is connected to the sliding element 322, the other end of the first connecting rod 324 is hinged to second connecting rod 326. The controlling mechanism 34 includes a sliding block 342, a first elastic element 344, a second elastic element 346, and a button 348. The sliding block 342 is located between the second elastic element 346 and the button 348. The first elastic element 344 provides an elastic force for driving the second connecting rod 326 to rotate.

The sliding element is substantially pole shaped. One end of the sliding element 322 is secured to the cover 10, and the other end of the sliding element 322 is slidably mounted to the base 20. In this embodiment, the sliding element 322 may be secured to the cover 10 by the following means: the cover 10 defines a hole 12 (referring to FIG. 3) for securely (e.g., holt-melted) accommodating one end of the sliding element 322. The manner of slidably mounting the other end of the sliding element 322 to the base 20 will be described hereinafter.

The first connecting rod 324 has a first mating opening 3242 and a second mating opening 3244 respectively defined in two opposite ends thereof. The first mating opening 3242 is configured to accommodate a center portion of the sliding element 322 so that the sliding element 322 is mounted on the first connecting rod 324. The second mating opening 3244 is configured for hinging to the second connecting rod 326. The second connecting rod 326 has a first mating pole 3262 protruding from one end thereof. The first mating pole 3262 is rotatably accommodated in the second mating opening 3244, so that the first connecting rod 324 is hinged to the second connecting rod 326. The second connecting rod 326 has a third mating opening 3264 defined at another end thereof. The third mating opening 3264 is configured to rotatably engage with the base 20. The second connecting rod 326 has a latching pole 3268 (See FIG. 3) protruding from a surface 3266 thereof facing the base 20, and the latching pole 3268 is located adjacent to the third mating opening 3264.

Figure 3:
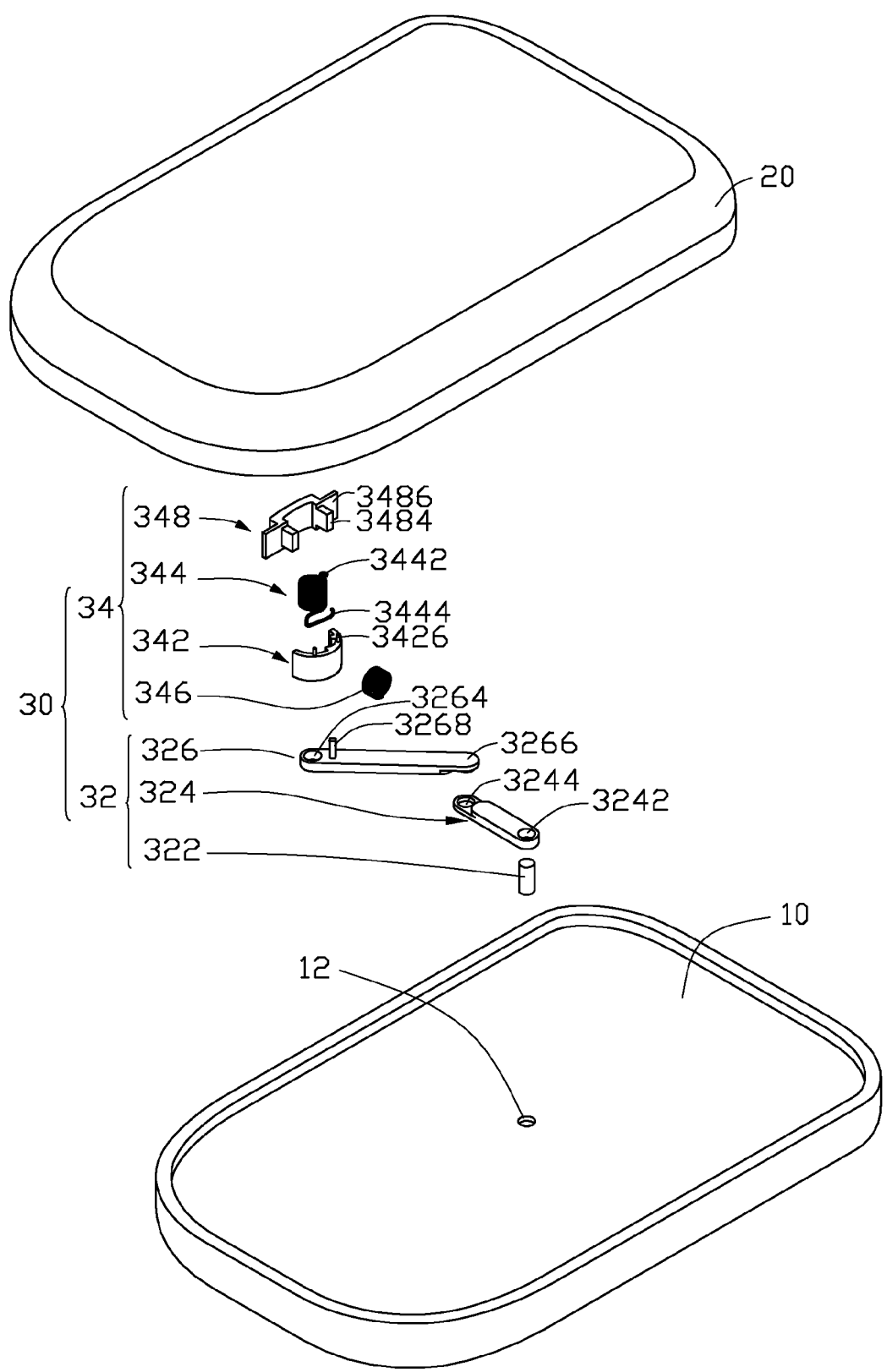
FIG. 3 is similar to the FIG. 2, but showing the portable electronic device in another aspect.

The sliding block 342 is arcuate and has a first latching ribbing 3422 and a second latching ribbing 3424 longitudinally protruding from an inner surface thereof. The first latching ribbing 3422 is spaced from the second latching ribbing 3424. When the portable electronic device is in a closed state, the latching pole 3268 is latched to the first latching ribbing 3422 (See FIG. 5). When the portable electronic device is in an open state, the latching pole 3268 is latched to the second latching ribbing 3424 (See FIG. 7). Referring to FIG. 3, the sliding block 342 has two spaced guiding poles 3426 protruding from one side thereof facing the base 20. The guiding poles 3426 are configured to guide the sliding block 342 to slide relative to the base 20.

Referring to FIGS. 2 and 3, the first elastic element 344 provides an elastic force for rotating the second connecting rod 326 relative to the base 20. The second elastic element 346 provides an elastic force for restoring the sliding block 342 to its original state. In this embodiment, the first elastic element 344 is a columnar coil, and the second elastic element 346 is a columnar compression spring. The first elastic element 344 has a securing ring 3442 protruding outwardly from one end thereof and a hook 3444 protruding outwardly from another end thereof. The second elastic element 346 is held between the sliding block 342 and the base 20, i.e., one end of the second elastic element 346 is resisted against the sliding block 342, another end of the second elastic element 346 is resisted against the base 20. The button 348 has an operating portion 3482 protruding from one side thereof and two spaced contacting portions 3484 protruding from another side thereof opposite to the operating portion 3482, so that two flanges 3486 are formed at two opposite ends of the button 348. The contacting portions 3484 correspond to two ends of the sliding block 342 and are configured for contacting the sliding block 342.

The base 20 includes a top surface 22 and a side surface 24 connected to the top surface 22. The base 20 has a compartment 222 defined in the top surface 22 corresponding to the controlling mechanism 34 and a sliding groove 224 longitudinally defined in the top surface 22 corresponding to the sliding element 322. The compartment 222 is defined through the side surface 24, so a bottom wall 2220, a first inner wall 2221 parallel to the side surface 24 of the base 20, and two opposite second inner walls 2222 connected to the side surface 24 are defined in the compartment 222. The sliding groove 224 is configured to slidably accommodate the sliding element 322.

The base 20 has a second mating pole 2223 protruding from the bottom wall 2220 corresponding to the third mating opening 3264, a first retaining pole 2224 protruding from the bottom wall 2220 adjacent to the second mating pole 2223, and two guiding grooves 2225 (see FIG. 5 and FIG. 7) defined in the bottom wall 2220 corresponding to the guiding poles 3426 of the sliding block 342. The second mating pole 2223 is rotatably accommodated in the third mating opening 3264. The securing ring 3442 of the first elastic element 344 is wound on the first retaining pole 2224 to secure the first elastic element 344 on the base 20. The guiding grooves 2225 are configured to slidably accommodate the guiding poles 3426 therein.

The base 20 has a second retaining pole 2226 protruding from the first inner wall 2221. The second retaining pole 2226 is configured to secure the second elastic element 346 to the base 20. The base 20 has two slots 2227 defined in the second inner wall corresponding to the flanges 3486 of the button 348. The flanges 3486 are slidably accommodated in the slots 2227.

Figure 4:
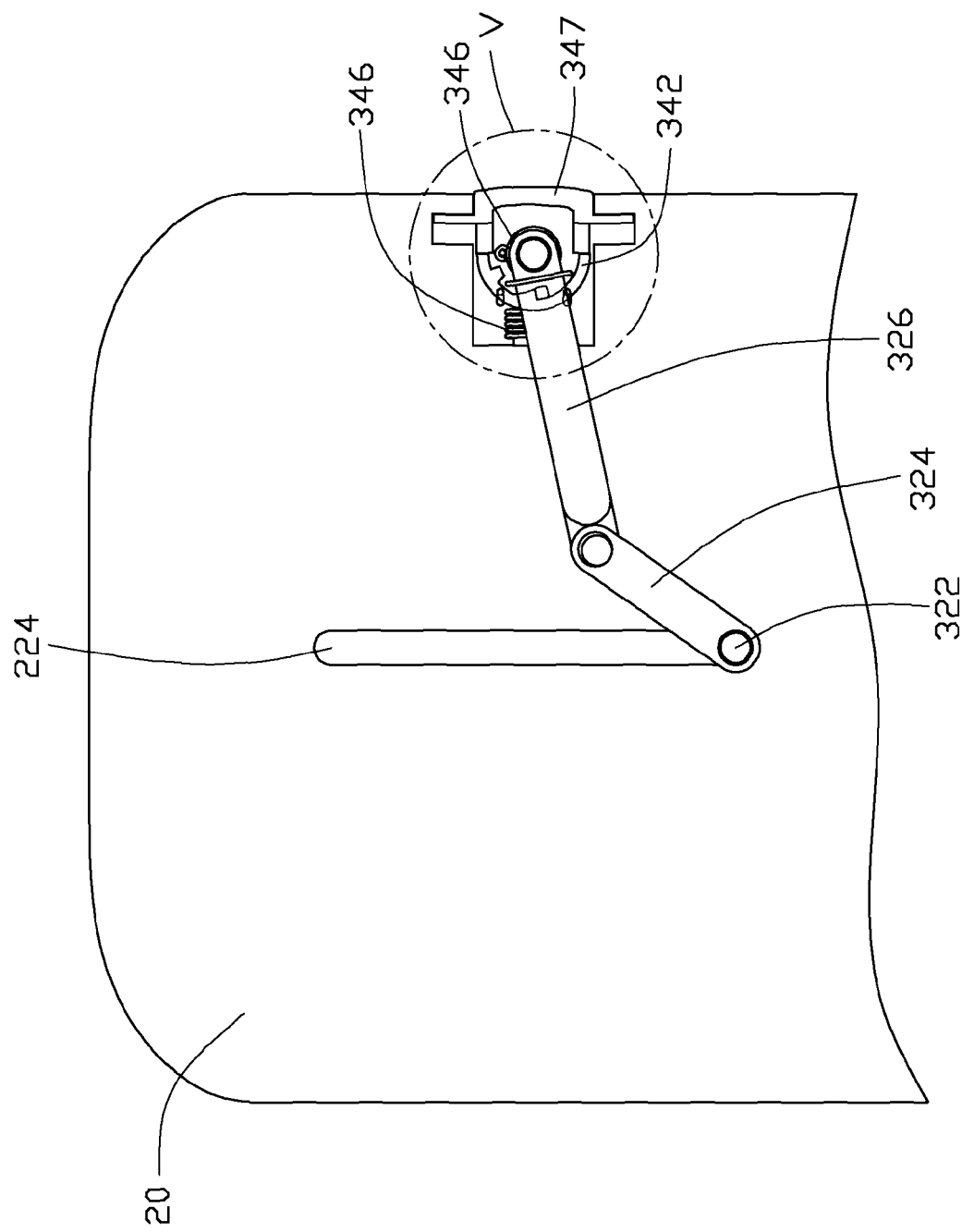
FIG. 4 is a partially enlarged view of the portable electronic device as the cover is detached.
Figure 5:
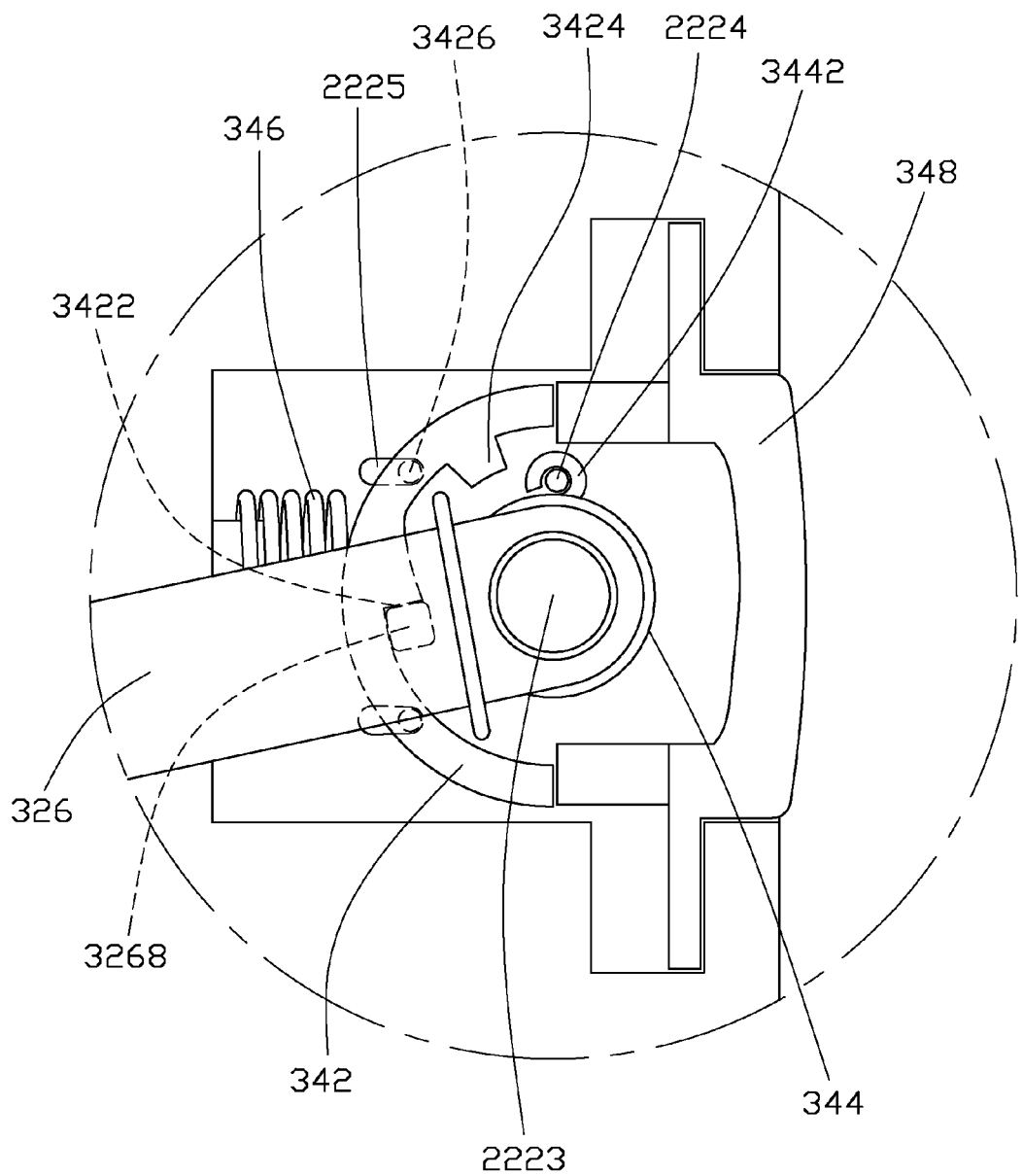
FIG. 5 is a partially enlarged view of the portable electronic device shown in FIG. 4.

Referring to FIGS. 4 and 5, during assembly of the portable electronic device 100, firstly, the second elastic element 346 is wound around the second retaining pole 2226. Secondly, the sliding block 342 is received in the compartment 222. At this time, the guiding poles 3426 are correspondingly accommodated in the guiding grooves 2225, and the second elastic element 346 is twisted to accumulate elastic force. The first elastic element 344 is wound to the second mating pole 2223. At this time, the securing ring 3442 is retained on the first retaining pole 2224. Then, the button 348 is put into the compartment 222 with the flanges 3486 of the button 348 being accommodated in the slots 2227 of the base 20. At this stage, the contacting portions 3484 of the button 348 resist against the two ends of the sliding block 342. The first mating pole 3262 is rotatably accommodated in the second mating opening 3244 to hinge the first connecting rod 324 to the second connecting rod 326.

After that, the second mating pole 2223 is rotatably accommodated in the third mating opening 3264 of the second connecting rod 326, i.e., the second connecting rod 326 is hinged to the base 20. The hook 3444 of the first elastic element 344 is secured to the second connecting rod 326 to connect the connecting rod mechanism 32 to the controlling mechanism 34. The center portion of the sliding element 322 is secured (e.g., hot-melted) in the first mating opening 3242, to fix the sliding element 322 to the first connecting rod 324. The end portion of the sliding element 322 facing the base 20 is slidably accommodated in the sliding groove 224 of the base 20, and another end portion of the sliding element 322 facing the cover 10 is secured in the hole 12 of the cover 10.

Finally, the cover 10 is slid relative to the base 20 to make the latching pole 3268 latch with the first latching ribbing 3422. At this time, the portable electronic device 100 is in a closed position, the sliding element 322 is located in one end of the sliding groove 224, and the first elastic element 344 is counterclockwise twisted to provide a clockwise elastic force to the second connecting rod 326. Thus, the second connecting rod 326 tends to rotate clockwise.

Figure 6:
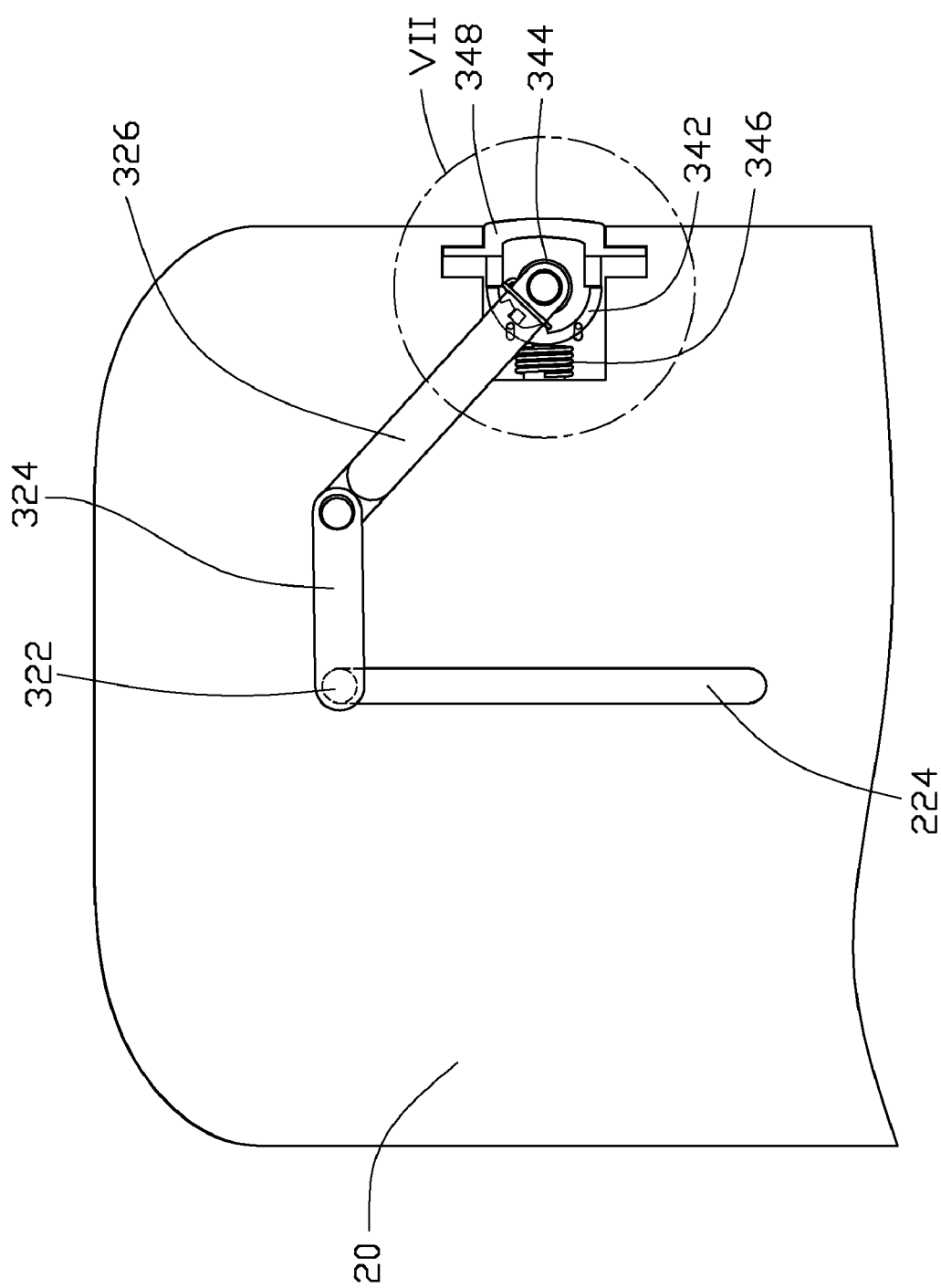
FIG. 6 is similar to FIG. 4, but the sliding mechanism is in another state.
Figure 7:
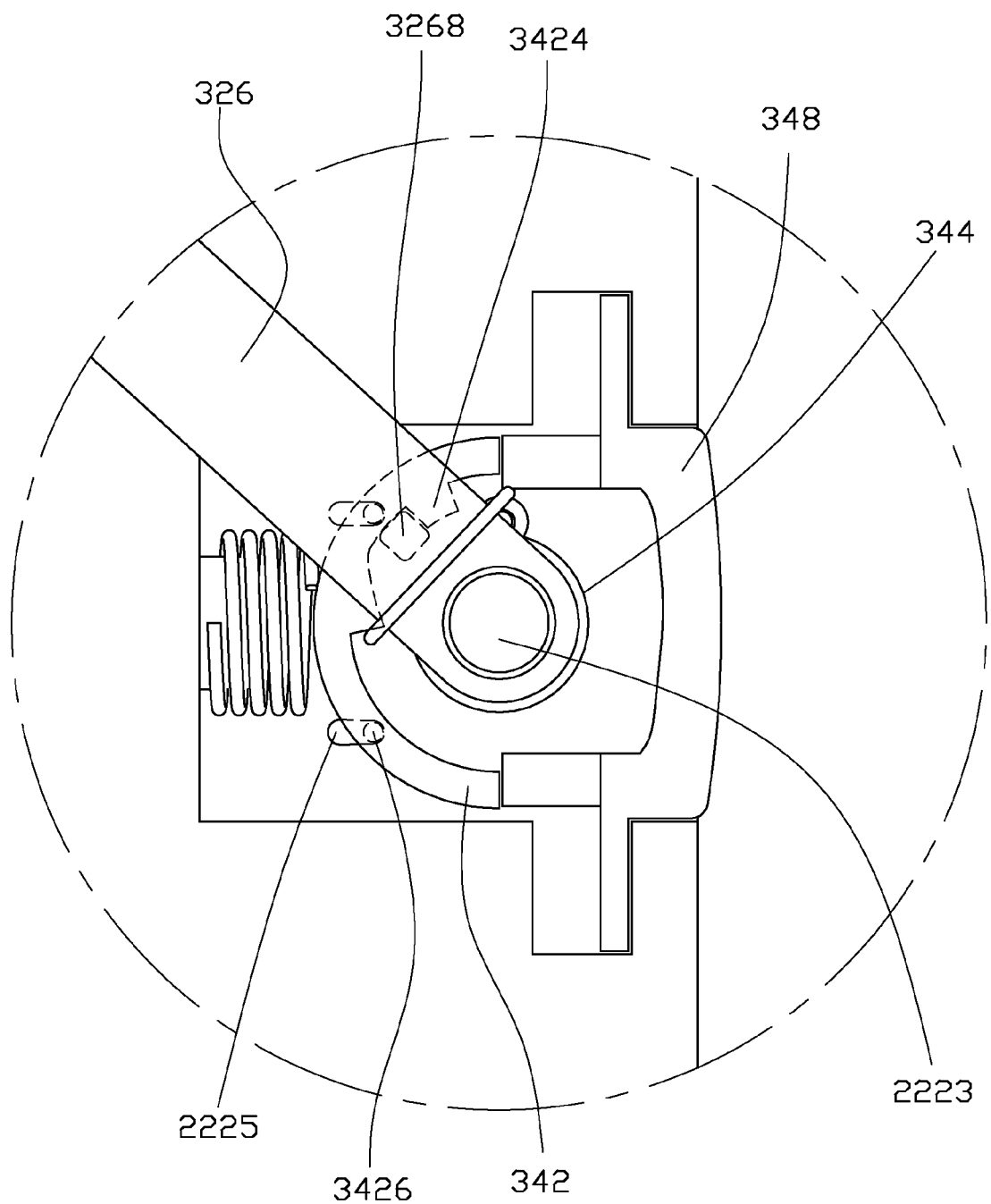
FIG. 7 is a partially enlarged view of the portable electronic device shown in FIG. 6.

Referring to FIGS. 6 and 7, in use, pressing the operating portion 3482 of the button 348, the contacting portions 3484 biases the sliding block 342 to slide in the compartment 222 with the guiding poles 3426 slides in the guiding grooves 2225 of the base 20 and the second elastic element 346 is compressed to accumulate elastic force, until the first latching ribbing 3422 is released from the latching pole 3268 of the second connecting rod 326. At this time, the sliding block 342 is restored to its original state under the elastic force of the second elastic element 346. The second connecting rod 326 is clockwise rotated under the elastic force of the first elastic element 344, which drives the first connecting rod 324 to rotate clockwise and further drives the sliding element 322 to slide toward another end of the sliding groove 224. Additionally, the sliding element 322 is fixed to the cover 10, so the cover 10 slides relative to the base 20 at this time.

Once the sliding element 322 is slid to another end of the sliding groove 224, the cover 10 is in an open state. At this time, the latching pole 3268 is latched to the second latching ribbing 3424, and the second connecting rod 326 is under clockwise pressure, so that the cover 10 is securely located in the opened state.

When closing the cover 10 again, the cover 10 is reversely pushed with the sliding element 322 sliding in the sliding groove 224, until the sliding element 322 reaches its original state. At this time, the latching pole 3268 is latched to the first latching ribbing 3422 again, so the cover 10 is securely located in the closed position.

Once the button 348 is pressed, the sliding mechanism 30 can automatically drive the cover 10 to move to predetermined positions. Thus, the portable electronic device using the sliding mechanism 30 can be conveniently used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
a cover;
a base; and
a sliding mechanism, the sliding mechanism including a connecting rod mechanism and a controlling mechanism;
wherein the connecting rod mechanism is rotatably mounted between the base and the cover and is configured to slide the cover relative to the base, the controlling mechanism is releasably latched with the connecting rod mechanism, after the connecting rod mechanism is released from the controlling mechanism, the connecting rod mechanism rotates relative to the base and the cover; the connecting rod mechanism includes a sliding element, a first connecting rod and a second connecting rod, the sliding element is mounted to one end of the first connecting rod, one end of the second connecting rod is hinged with another end of the first connecting rod.

2. The portable electronic device of claim 1, wherein the base has a sliding groove longitudinally defined therein facing the cover, one end of the siding element is mounted to the base, another end of the sliding element is slidably accommodated in the sliding groove, another end of the second connecting rod is hinged with the base.

3. The portable electronic device of claim 2, wherein the controlling mechanism includes a first latching ribbing and a second latching ribbing spaced from the first latching ribbing, the second connecting rod has a latching pole protruding therefom, the latching pole is alternately latching with the first latching ribbing and the second latching ribbing to open or close the cover relative to the base.

4. The portable electronic device of claim 3, wherein the controlling mechanism further includes a sliding block, the first latching ribbing and the second latching ribbing are both protruding from the sliding block.

5. The portable electronic device of claim 4, wherein the sliding block is arcuate, the first latching ribbing and the second latching ribbing are protruding from an inner wall of the sliding block.

6. The portable electronic device of claim 4, wherein the sliding block has a plurality of guiding poles facing the base, the base has a plurality of guiding grooves defined therein corresponding to the guiding poles, the guiding poles are slidably accommodated in the guiding grooves.

7. The portable electronic device of claim 4, wherein the controlling mechanism further includes a first elastic element, the first elastic element provides an elastic force for rotation of the connecting rod mechanism relative to the base.

8. The portable electronic device of claim 7, wherein one end of the first elastic element is mounted to the base, another end of the first elastic element is mounted to the second connecting rod.

9. The portable electronic device of claim 8, wherein the first elastic element is a coil, and one of the first elastic element is mounted to the base, another end of the first elastic element is mounted to the second connecting rod.

10. The portable electronic device of claim 7, wherein the controlling mechanism further includes a second elastic element, the second elastic element is resisted between the sliding block and the base to provide an elastic force for returning the sliding block to its original state.

11. The portable electronic device of claim 4, wherein the controlling mechanism further includes a button, the button is configured to trigger the sliding block.

12. The portable electronic device of claim 11, wherein the button has two contacting portions protruding from a side thereof facing the sliding block, the contacting portions are resisted against two ends of the sliding block.

13. A portable electronic device comprising:
a cover;
a base, the base having a sliding groove defined therein facing the cover; and
a sliding mechanism, the sliding mechanism including a connecting rod mechanism and a controlling mechanism;
wherein one end of the connecting rod mechanism is hinged with the base, another end of the connecting rod mechanism is partially mounted to the cover and is partially slidably accommodated in the guiding groove, the controlling mechanism is configured to rotate the connecting rod mechanism relative to the base and control the rotation of the connecting rod mechanism.

14. The portable electronic device of claim 13, wherein the connecting rod mechanism includes a sliding element, a first connecting rod and a second connecting rod, the sliding element is mounted to one end of the first connecting rod, and one end of the siding element is mounted to the base, another end of the sliding element is slidably accommodated in the sliding groove, another end of the first connecting rod is hinged with one end of the second connecting rod, another end of the second connecting rod is hinged with the base.

15. The portable electronic device of claim 14, wherein the controlling mechanism includes a sliding block and a first elastic element, the sliding block has a first latching ribbing and a second latching ribbing spaced from the first latching ribbing, the second connecting rod has a latching pole protruding therefom, when the first latching ribbing is latching with the latching pole, the portable electronic device is in closed state, when the second latching ribbing is latching with the latching pole, the portable electronic is in opened state, the first elastic element provides an elastic force for rotation of the connecting rod mechanism relative to the base.

16. The portable electronic device of claim 15, wherein the sliding block is arcuate, the first latching ribbing and the second latching ribbing are protruding from an inner wall of the sliding block.

17. The portable electronic device of claim 16, wherein the sliding block has a plurality of guiding poles facing the base, the base has a plurality of guiding groove defined therein corresponding to the guiding poles, the guiding poles are slidably accommodated in the guiding grooves.

18. The portable electronic device of claim 15, wherein the controlling mechanism further includes a button, the button is configured to trigger the sliding block.

19. The portable electronic device of claim 15, wherein the controlling mechanism further includes a second elastic element, the second elastic element is resisted between the sliding block and the base to provide an elastic force for returning the sliding block to its original state.

* * * * *